(12) United States Patent
Lin

(10) Patent No.: US 6,649,105 B2
(45) Date of Patent: Nov. 18, 2003

(54) METHOD OF MANUFACTURING FLEXIBLE TRANSPARENT POLYVINYL CHLORIDE FILM WITHOUT FACIAL FLOW MARKS AND PITS

(75) Inventor: Tai-Hsiung Lin, Taipei (TW)

(73) Assignee: Nan Ya Plastics Corporation, Taipei (TW)

( * ) Notice: Subject to any disclaimer, the term of this patent is extended or adjusted under 35 U.S.C. 154(b) by 351 days.

(21) Appl. No.: 09/853,594

(22) Filed: May 14, 2001

(65) Prior Publication Data
US 2002/0190421 A1 Dec. 19, 2002

(51) Int. Cl.⁷ .......................... B29C 39/14; B29C 43/24
(52) U.S. Cl. ........................................ 264/175; 264/232
(58) Field of Search .......................... 264/175, 232, 264/234, 237

(56) References Cited

U.S. PATENT DOCUMENTS

| | | | | |
|---|---|---|---|---|
| 2,278,231 A | * | 3/1942 | Wright | 524/184 |
| 3,039,147 A | * | 6/1962 | Burkhart et al. | 264/291 |
| 3,171,873 A | * | 3/1965 | Fikentscher et al. | 264/216 |
| 4,443,399 A | * | 4/1984 | Takashige et al. | 264/519 |
| 4,454,294 A | * | 6/1984 | Zentner et al. | 526/344.3 |
| 5,298,202 A | * | 3/1994 | Schirmer | 264/470 |
| 5,581,610 A | * | 12/1996 | Hooshiari | 379/133 |
| 5,772,941 A | * | 6/1998 | Nakano | 264/175 |
| 6,224,805 B1 | | 5/2001 | Fields et al. | |
| 6,287,706 B1 | * | 9/2001 | Simpson et al. | 428/516 |
| 6,296,732 B1 | * | 10/2001 | Enlow et al. | 156/209 |

FOREIGN PATENT DOCUMENTS

| | | | |
|---|---|---|---|
| DE | 3907036 C1 | * | 9/1990 |
| EP | 1262298 A1 | * | 4/2002 |

* cited by examiner

Primary Examiner—Mark Eashoo
(74) Attorney, Agent, or Firm—Stevens, Davis, Miller & Mosher, LLP

(57) ABSTRACT

A method of manufacturing thermoplastic flexible transparent PVC film (sheet) without flow marks and air pit is capably provided with high efficient production to upgrade the quality of plastic film (sheet), which is included the following steps: calendering melted plastic material by calenders into melting plastic film (sheet) with predetermined thickness, quickly chilling and setting the melting plastic film (sheet) with chilling water, removing water from the cooled plastic film, heating the plastic film to dry out any residual water and controlling the plastic film again to a temperature from 30° C. to 85° C., and applying a pressure ranging from 1 kg/cm² to 8 kg/cm² on the plastic film (sheet) while winding it into a roll. Plastic film (sheet) produced with this method has good transparency and smooth surface without flow mark and air pit.

8 Claims, 2 Drawing Sheets

METHOD OF MANUFACTURING FLEXIBLE TRANSPARENT POLYVINYL CHLORIDE FILM WITHOUT FACIAL FLOW MARKS AND PITS

BACKGROUND OF THE INVENTION

1. Field of the Invention

The present invention relates to a method of manufacturing flexible transparent polyvinyl chloride film without facial flow marks and pits to upgrade the quality of the plastic film (sheet).

2. Description of the Prior Art

In conventional manufacturing process for clear polyvinyl chloride plastic film (sheet), raw material is sufficiently processed and become fully melted state by having it through a mixer, a high speed mixer, a roller machine, and an extruder for working operation so that the melted plastic material after fed and passed to a calender is capably further formed as a film (sheet) material with a desired thickness. Continuously, the film (sheet) material formed is worked by passing a take off roller set with multiple heated or cooled rollers and a cooling roller set internally supplied with cold water to make it filly formation before to be wound into rolls as a finished product.

But, the plastic film (sheet) manufactured from the above conventional method is still existed with the following drawbacks:

(1) The high-temperature melted plastic material is gradually cooled to room temperature during the manufacturing process. During this cooling process, the half-set plastic material is subjected to considerable stretch while its molecules have gradually lost their fluidity. As a result, linear streaks are formed on the surface of the plastic film (sheet).

(2) When winding the plastic film at high speed, a considerable amount of air is brought into the roll between every two adjacent layers of the plastic film (sheet). The air converges to form bubbles widely spreading between the layers, producing pits on the surface of the plastic film (sheet).

SUMMARY OF THE INVENTION

The primary object of the present invention is to provide a method of manufacturing flexible transparent polyvinyl chloride film without facial flow marks and pits to upgrade the quality of the plastic film (sheet).

The method according to the present invention mainly includes following steps:

1. Preparing softened and melted PVC material;
2. Feeding the melted plastic material into calender, so that the material is gradually calendered to be a (sheet) having a desired thickness;
3. Sending the film (sheet) material into a water bath tank having a water temperature between 20° C. and 85° C. to chill and set the material quickly, so that the polyvinyl chloride is partially crystallized to create good transparency, and the melted plastic material instantaneously forms a uniform and stable flexible film (sheet) without facial flow marks;
4. Sending the cooled flexible plastic film (sheet) to pass a water removing equipment in which more than one soft rubber roller and metal roller cooperate with other supplemental water removing means, such as scrappers, air knives, and vacuum suckers, to remove water attached to the surface of the plastic film (sheet) coming out of the bath tank;
5. Sending the plastic film (sheet) coming out of the water removing equipment to pass a series of heating rollers coated with water-absorbent material; heating the plastic film to a temperature from about 40° C. to about 150° C. to remove residual water and stress from the plastic film (sheet) then control the plastic film (sheet) to a temperature from about 30° C. to about 85° C.;
6. Winding up the plastic film (sheet) into rolls and applying a pressure from about 1 kg/cm$^2$ to 8 kg/cm$^2$ on the surface of the wound plastic film (sheet) to prevent air to be trapped from forming air bubbles, this film (sheet) with very smooth surface can be produced. If the film (sheet) is wound up by conventional method, usually air bubbles or pit should form on the surface of the plastic film (sheet) due to air captured between two layers of the plastic film (sheet) for a prolonged time.

DETAILED DESCRIPTION OF THE PREFERRED EMBODIMENTS

Figure 1:
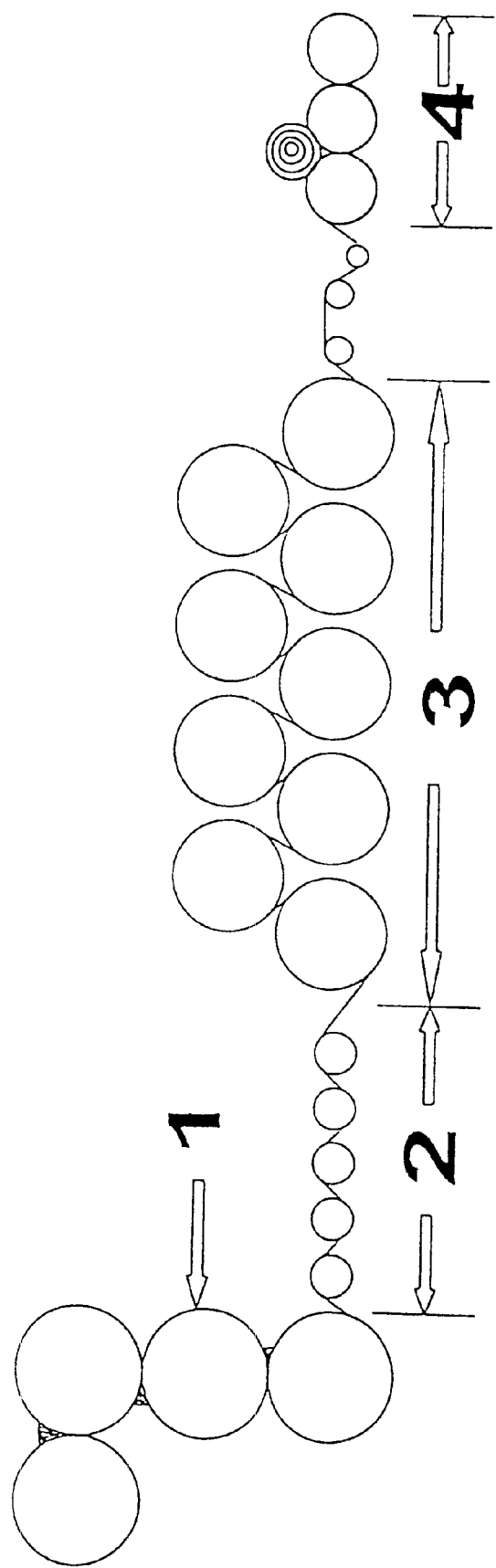
FIG. 1 is a flow chart showing a conventional manufacturing process of clear polyvinyl chloride film, wherein calender 1, take off roller set 2, cooling rollers 3, and a winding machine 4 are equipped in the process.

Please refer to FIG. 1 in which a conventional manufacturing process of clear polyvinyl chloride (PVC) film (sheet) is shown. In the process, calender 1, take off roller set 2, cooling rollers 3, and a winging machine 4 are employed to produce the plastic film (sheet).

To produce the plastic film (sheet), such as those of PVC resin, plasticizer, and stabilizer etc. are first mixed in prescribed proportions and the resultant mixture is fed to pass the mixer, mixing roller (A, B) (not shown) to be fully melted. The melted plastic material is immediately fed into the calender 1 to be progressively rolled into a predetermined thickness. The material comes out of the calender 1 to pass through the take off roller set 2, at where the material is heated or cooled to achieve primary setting. Therefore, the material leaves the take off rollers 2 and moves through the cooling rollers 3 which are internally supplied with chilling water or cooling water (not shown) to get the material fully cooled and set. Finally, the material is sent to the winding machine 4 to be wound into rolls, as a finished product.

Figure 2:
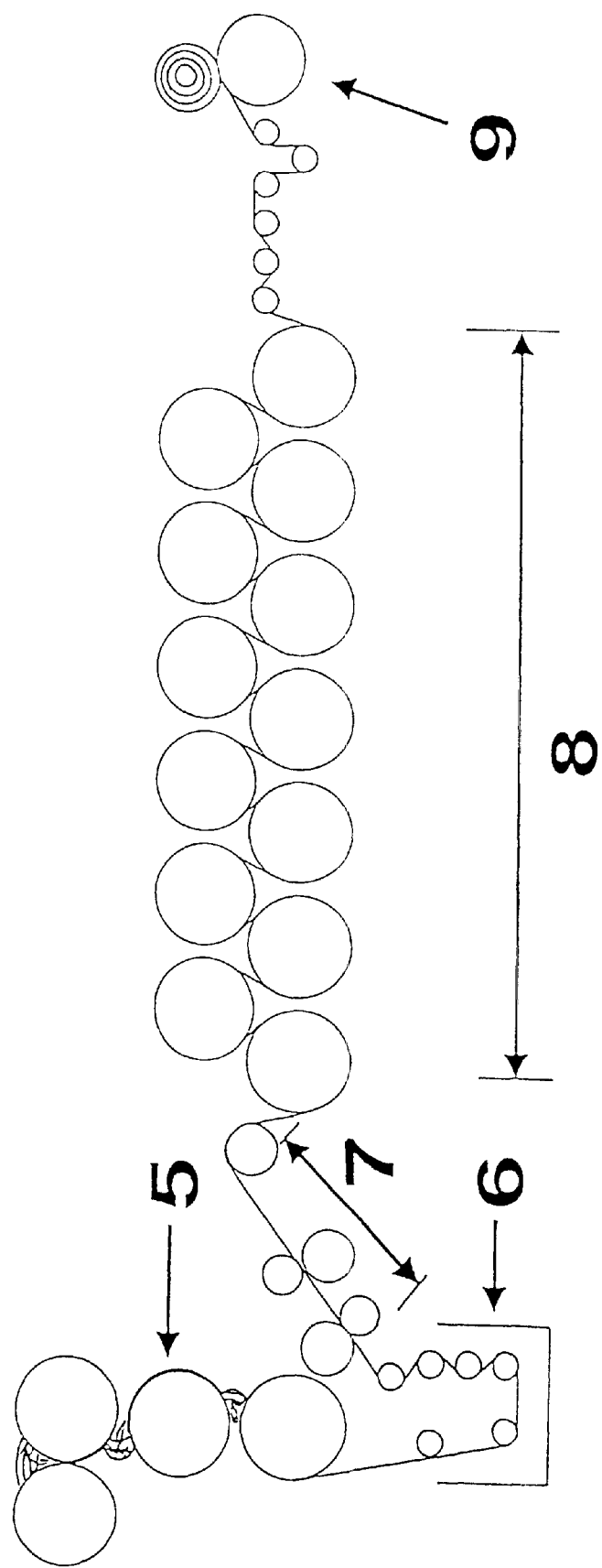
FIG. 2 is a flow chart showing a manufacturing process for flexible transparent polyvinyl chloride film according to the method of this present invention, wherein calender 5, a water bath tank 6, a water removing equipment 7, a series of heated and cooled rollers 8, and a winging machine 9 are equipped in the process.

FIG. 2 illustrates an improved manufacturing process of flexible transparent polyvinyl chloride film (sheet) according to the method of this present invention. In the method of the present invention, such as those of PVC resin, plasticizer and stabilizer (not shown) are mixed in prescribed proportions and then fed to pass the high-temperature mixer and mixing roller (and, if necessary, an extruder), so that the mixed PVC material is fully melted, just like in the conventional manufacturing process. The melted plastic material is sent to pall through calender 5. By controlling clearances among the calender 5 to a predetermined gauge, the melted plastic material comes out of the calender 5 in the melted plastic material comes out of the calender 5 in a softened and flat form with a desired thickness.

The flat PVC material coming out of the calender 5 has a high temperature ranging from 160° C. to 190° C. and is immediately guided to pass a water bath tank 6 in which water temperature is controlled to range from 20° C. to 85° C., so that the flat PVC material is immediately cooled and set, forming a partially crystallized, completely transparent plastic film (sheet). It is very important to have the temperature of the water in the water bath tank 6 under control. Otherwise, undesired high water amount will be left on the plastic film coming out of the water bath tank 6 to cause not only poor production efficiency but also flow marks on the surface of the plastic film (sheet).

A water removing equipment 7 is provided after the water bath tank 6. In the water removing equipment 7, pressing rollers including metal rollers and rubber rollers cooperate with other supplemental water removing and sucking means, such as idlers, scrapers, air knives, water suckers, etc., to work on the plastic film (sheet) coming out of the water bath tank 6, so that little or no water is left on the surface of the plastic film (sheet). If this equipment is omitted, water attached to the plastic film (sheet) will be brought along with the plastic film (sheet) to subsequent manufacturing procedures and adversely affects the production efficiency and quality.

A group of heated/cooled rollers 8 are provided after the water removing equipment 7. Cooling water is continuously supplied into the cooled rollers. The heated rollers are maintained at a temperature ranging from 40° C. to 150° C. All the cooled and heated rollers are of metal rollers coated (or wrapped) with water absorbent material, such as cloth. As mentioned above, the cooling rollers adopted in the conventional manufacturing process for plastic film (sheet) is internally supplied with chilling or cooling water. However, the cooled rollers adopted in the method of this present invention function not only controlling the temperature of the plastic film (sheet) before winding, but also removing residual water and eliminate stress from the plastic film (sheet).

A winding machine 9 is provided after the heated and cooled roller group 8 for winding the plastic film (sheet) into a roll. The plastic film (sheet) coming out of the heated and cooled roller group 8 has a temperature ranging from 30° C. to 85° C. An adequate pressure ranging from 1 to 8 kg/cm$^2$ is applied on the plastic film (sheet) during winding, so as to prevent air from being brought into the roll and staying between two layers of the plastic film (sheet). By this way, plastic film (sheet) having smooth surface without pits can be obtained.

Following are examples of producing plastic films (sheets) of different thickness separately in the conventional method and in the method of this present invention.

EXAMPLE 1

Conventional Method

To produce 0.2 mm thickness, clear, PVC sheet with softness of 40 PHR (per hundred resin), following ingredients are used:

| | |
|---|---|
| PVC (P = 1250) | 100 |
| DOP (Dioctyl Phthalate) | 40 |
| Barium-Zinc Stearate stabilizer | 2–4 |

The above ingredients are stirred and mixed in a high-speed mixer for 5 minutes. The resultant mixture is fed into the mixer to be further mixed and melted to a temperature ranging from 160° C. to 180° C., so that the mixture is in a completely melted form. The melted material is sent to pass the mixing roller (A, B) and the temperature of the material is maintained in the range from 160° C. to 180° C. The material is then sent to pass the cooling rollers 3 (which are usually internally supplied with cold water) so that it is cooled and set for winding into a roll. This is the generally known clear PVC film (sheet). A difficult problem with the clear PVC film produced in the conventional method is the flow mark and air pits on the surface of the plastic film (sheet).

EXAMPLE 2

A First Embodiment of This Present Invention

In this example 2, the same 0.2 mm thickness, transparent PVC sheet with a softness of 40 PHR is produced. The ingredients and the conditions for steps from the mixing of ingredients to the feeding of melted material into the calender are all the same as that used in the above example 1. However, the melted material coming out of the calender 5 in this example 2 is a sheet material having a controlled thickness and is immediately sent into the subsequent water bath tank 6. Water in the water bath tank 6 is controlled at a temperature ranging from 20° C. to 85° C., so that the material coming out of the calender 5 is cooled and partially crystallized. The material leaves the water bath tank 6 and passes a group of pressing rollers 7 which preferably include one to three sets of rubber roller and metal roller combinations. A pressure ranging from 1 kg/cm$^2$ to 6 kg/cm$^2$ carried into by the pressing rollers 7 can be pressed on the material when its passing through. The pressing rollers 7 cooperate with other necessary water removing means, including idlers, scrappers, air knives, and vacuum suckers, to remove water from the surface of the sheet material. Thereafter, the sheet material is sent to pass a series of heated and cooled rollers 8. The cooled rollers are internally supplied with cold water at room temperature. The heated rollers are coated (or wrapped) with water-absorbent material and have a surface temperature ranging from 40° C. to 150° C. to dry off any residual water from the sheet material. The cooled rollers once again cool the sheet material to a controlled temperature between 30° C. and 85° C. The sheet material coming out of the heated and cooled rollers 8 is sent to the winding machine 9 and is wound into a roll at a linear speed of 60 +/−10 meters/minute under a pressure ranging from 1 kg/cm$^2$ to 8 kg/cm$^2$.

EXAMPLE 3

A Second Embodiment of This Present Invention

In this example, a 0.5 mm thickness, transparent PVC sheet with a softness of 40 PHR is produced. The ingredients and the conditions in steps from the mixing of ingredients to the feeding of melted material into the calender are all the same as that used in the above example 1 and 2. The calenders 5 in this example 3 are adjusted to produce a plastic sheet in the thickness of 0.5 mm.

The sheet material coming out of the calender 5 is sent into the water bath tank 6 which has a controlled water temperature ranging from 20° C. to 85° C. The next steps of passing through the water removing equipment 7 and the heated and cooled rollers 8, as well as the temperature and pressure at which the plastic sheet is wound in this example 3 all are the same as that in the example 2 (that is, the first embodiment of this present invention), except that the winding speed in this example 3 is set to between 15 and 30 meters/minute. The finished product of plastic sheet wound into a roll is 0.5 mm thickness without flow marks or pits on the film surface.

What is claimed is:

1. A method of manufacturing flexible transparent polyvinyl chloride film without facial flow marks and pits, which steps comprises:

a. a transparent softened polyvinyl chloride film without facial flow marks to be formed by primarily use of the melted PVC material after completely calendered by a calender as a flat film then being immediately guided to pass a water bath tank for immediately cooled so as to make it to be formed as a completely transparent PVC film with partially crystallized state and without facial flow marks;

b. by way of a water removing equipment to remove the water adhered to the surface of the completely transparent PVC film when after coming out of a water bath tank to improve the production efficiency and quality;

c. subsequently the completely transparent PVC film is sent to pass a series of heated and cooled rollers to once again cool and heat it and to have it to be obtained a fully formation and kept in a controlled temperature at between 30° C. and 85° C. before winding; and d. after coming out of the heated and cooled rollers the completely transparent PVC film is sent to a winding machine and under keeping in controlled temperature at between 30° C. and 85° C. and under a pressure ranging from 1 kg/cm$^2$ to 8 kg/cm$^2$ is wound into a roll at a linear speed of 60 +/−10 meters/minute so as to prevent air from being entered and have it to be provided with smooth surface without air pits.

2. A method of manufacturing flexible transparent polyvinyl chloride film without facial flow marks and pits as defined in claim 1, wherein all the heated rollers or the cooled rollers are capably coated with water absorbent material such as cloth and controlled under a constant temperature so as to not only control the temperature of that of completely transparent PVC film when winding but also remove residual water and eliminate stress from the completely transparent PVC film.

3. A method of manufacturing flexible transparent polyvinyl chloride film without facial flow marks and pits as defined in claim 1, wherein the heated rollers are provided with a surface temperature ranging from 40° C. to 150° C. to dry off any residual water from the completely transparent PVC film.

4. A method of manufacturing flexible transparent polyvinyl chloride film without facial flow marks and pits as defined in claim 1, wherein for fully preventing air from being entered and having the completely transparent PVC film with smooth surface without air pits the proper winding pressure is evenly controlled to the surface of completely transparent PVC film or to the center of roll.

5. A method of manufacturing flexible transparent polyvinyl chloride film without facial flow marks and pits as defined in claim 1, wherein for fully preventing air from being entered and having the completely transparent PVC film with smooth surface without air pits a press wheel is disposed over the product of completely transparent PVC film while wound into roll or both ends of roll are pressed by pressure while wound completely transparent PVC film into roll.

6. A method of manufacturing flexible transparent polyvinyl chloride film without facial flow marks and pits as defined in claim 1, wherein the water bath tank is controlled at a temperature ranging from 20° C. to 85° C. so as to make the completely transparent PVC film with partially crystallized effect when cooled.

7. A method of manufacturing flexible transparent polyvinyl chloride film without facial flow marks and pits as defined in claim 1, wherein the water removing equipment may be replaced as pressing rollers to remove the water adhered to the surface of the completely transparent PVC film.

8. A method of manufacturing flexible transparent polyvinyl chloride film without facial flow marks and pits as defined in claim 7, wherein the pressing rollers may cooperate with auxiliary water removing means including idlers, scrappers, air knives and vacuum suckers to remove water from the surface of completely transparent PVC film.

\* \* \* \* \*